United States Patent
Kawai et al.

(10) Patent No.: US 6,839,073 B2
(45) Date of Patent: Jan. 4, 2005

(54) IMAGE FORMING APPARATUS

(75) Inventors: Koji Kawai, Tagata-gun (JP); Koji Tanimoto, Tagata-gun (JP); Kenichi Komiya, Kawasaki (JP); Daisuke Ishikawa, Sunto-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 34 days.

(21) Appl. No.: 10/457,742

(22) Filed: Jun. 10, 2003

(65) Prior Publication Data

US 2003/0227537 A1 Dec. 11, 2003

(30) Foreign Application Priority Data

Jun. 11, 2002 (JP) .......................................... 2002-170012

(51) Int. Cl.⁷ .......................... G02B 26/10; G02B 26/12
(52) U.S. Cl. ........................................ 347/234; 347/248
(58) Field of Search ................................ 347/234, 235, 347/248, 249, 250; 359/204, 212, 216, 217

(56) References Cited

U.S. PATENT DOCUMENTS

| 5,883,385 | A  | 3/1999  | Takahashi et al. |
| 6,392,684 | B1 | 5/2002  | Tanimoto et al.  |
| 6,462,855 | B1 | 10/2002 | Komiya et al.    |
| 6,509,921 | B2 | 1/2003  | Komiya et al.    |

FOREIGN PATENT DOCUMENTS

| JP | 9-189873 a    | 7/1997 |
| JP | 2001-091872 A | 4/2001 |

OTHER PUBLICATIONS

U.S. Appl. No. 10/457,504, filed Jun. 10, 2003, Ishikawa et al.

Primary Examiner—Huan Tran
(74) Attorney, Agent, or Firm—Foley and Lardner LLP

(57) ABSTRACT

An input value Y of digital data with respect to a D/A conversion unit for coarse adjustment and an input value X of digital data with respect to a D/A conversion unit for fine adjustment are controlled so as to allow a galvano-mirror to rotate in a direction in which a setting position of a laser beam B is within a predetermined position.

4 Claims, 9 Drawing Sheets

Input value X into D/A converter for fine adjustment

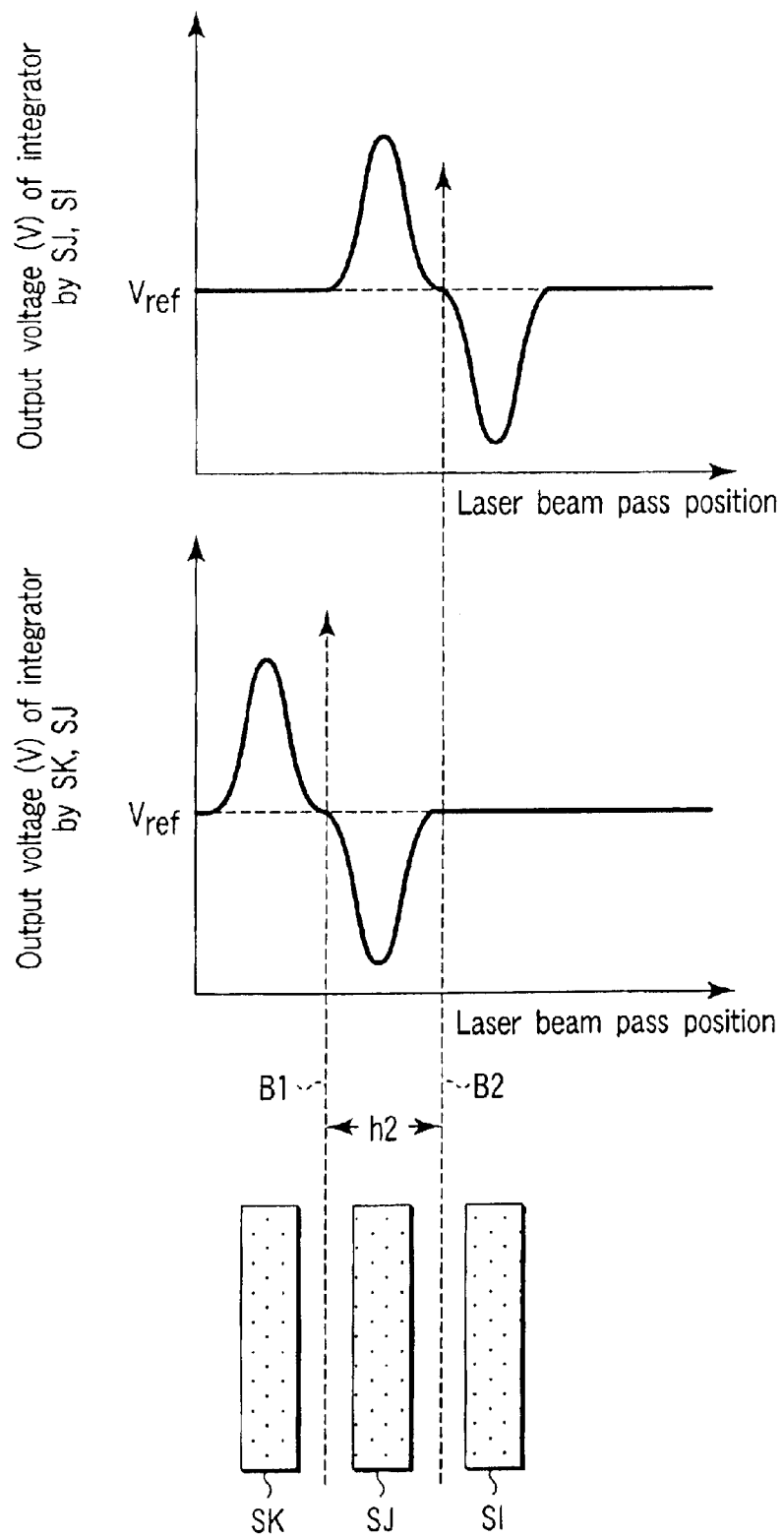
F I G. 11

IMAGE FORMING APPARATUS

CROSS-REFERENCE TO RELATED APPLICATIONS

This application is based upon and claims the benefit of priority from the prior Japanese Patent Application No. 2002-170012, filed Jun. 11, 2002, the entire contents of which are incorporated herein by reference.

BACKGROUND OF THE INVENTION

1. Field of the Invention

The present invention relates to an image forming apparatus which reads a document image and transfers it onto a sheet of paper.

2. Description of the Related Art

For image forming apparatuses such as photocopiers, the surface of a photosensitive drum, which is an image bearer, is scanned with a laser beam to form an electrostatic latent image on the surface of the photosensitive drum. The electrostatic latent image is developed (visualized) by a developing agent and transferred to a sheet of paper.

The laser beam emitted from a laser diode hits a galvano-mirror, and is reflected by the mirror to hit a polygon mirror, where it is reflected again. With rotation of the polygon mirror, the surface of the photosensitive drum is linearly scanned along an axial direction of the photosensitive drum. This line scanning is referred to as main scanning. Main scanning is repeatedly performed with the rotation of the photosensitive drum. The main scanning successively shifted with the rotation of the photosensitive drum is referred to as sub-scanning.

The galvano-mirror reflects the laser beam for the scanning, and rotates by an amount corresponding to a level of inputted driving voltage so that a reflection angle changes. By the rotation of the galvano-mirror, a scanning position of the laser beam can be adjusted in a sub-scanning direction.

In an example shown in Jpn. Pat. Appln. KOKAI Publication No. 2001-91872, the scanning position of the laser beam in the sub-scanning direction is optically detected, and the galvano-mirror is driven/controlled in such a manner that the detected scanning position becomes appropriate.

To drive the galvano-mirror, a digital/analog conversion unit (hereinafter referred to as a D/A conversion unit) is disposed into which digital data for continuously and finely adjusting the reflection angle of the galvano-mirror is inputted. When the digital data is inputted into the D/A conversion unit, the voltage of a level corresponding to the digital data is outputted from the D/A conversion unit. This output voltage is a driving voltage of the galvano-mirror.

Concretely, an input value of the digital data is controlled to increase/decrease (feedback-controlled) with respect to the D/A conversion unit so as to allow the galvano-mirror to rotate in a direction in which a scanning position of the laser beam is in a predetermined position.

To adjust the scanning position of the laser beam at a high resolution without narrowing the adjustment range in driving/controlling the galvano-mirror as described above, for example, a D/A conversion unit with a high resolution of a 16-bits type is used.

Additionally, the D/A conversion unit with a high resolution of the 16-bits type is expensive, and there is a problem that a cost rise of the apparatus results.

BRIEF SUMMARY OF THE INVENTION

The present invention has been developed in consideration of the above-described situation, and an object thereof is to provide an image forming apparatus in which a scanning position of a laser beam can be adjusted with a high resolution and high accuracy without incurring a rise in cost and without narrowing an adjustment range.

According to the present invention, there is provided an image forming apparatus comprising:

an image bearing member;

at least one beam generation unit which emits a beam for scanning the image bearing member;

a galvano-mirror which reflects the beam emitted from the beam generation unit for the scanning and which rotates by an amount corresponding to a level of an inputted driving voltage to change a reflection angle, thereby adjusting a scanning position of the beam;

a first digital/analog conversion unit into which digital data for continuously and finely adjusting the reflection angle of the galvano-mirror is inputted and which outputs a voltage signal of a level corresponding to the digital data;

a second digital/analog conversion unit into which digital data for stepwise and coarsely adjusting the reflection angle of the galvano-mirror is inputted and which outputs the voltage signal of the level corresponding to the digital data;

an amplification circuit which outputs the voltage of the level corresponding to the output voltage of the first digital/analog conversion unit and the output voltage of the second digital/analog conversion unit as a driving voltage to the galvano-mirror;

a detection section which detects the scanning position of the beam in the image bearing member;

a first control section which increases/decreases/controls an input value of the digital data with respect to the first digital/analog conversion unit in a state in which the input value of the digital data with respect to the second digital/analog conversion unit is set to a predetermined value so as to allow the galvano-mirror to rotate in a direction in which the scanning position detected by the detection section is within a predetermined position; and a second control section which shifts the input value of the digital data with respect to the first digital/analog conversion unit to the other limit value of the first digital/analog conversion unit and which shifts the input value of the digital data with respect to the second digital/analog conversion unit by one step, when the input value of the digital data with respect to the first digital/analog conversion unit changes by the first control section to reach one limit value of the first digital/analog conversion unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 11 is a diagram showing a relation between the pass position of the laser beam B in the photo-detection unit of FIG. 10 and the output voltage of the integration unit in the signal processing circuit;

DETAILED DESCRIPTION OF THE INVENTION

[1] A first embodiment of the present invention will be described hereinafter with reference to the drawings.

Figure 1:
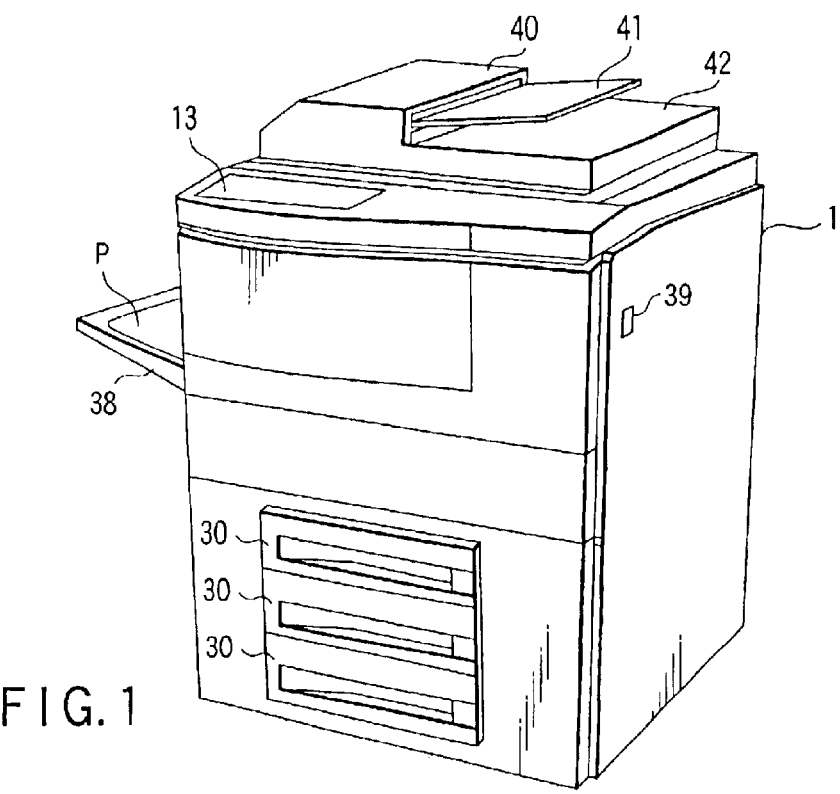
FIG. 1 is a perspective view showing an appearance of embodiments.
Figure 2:
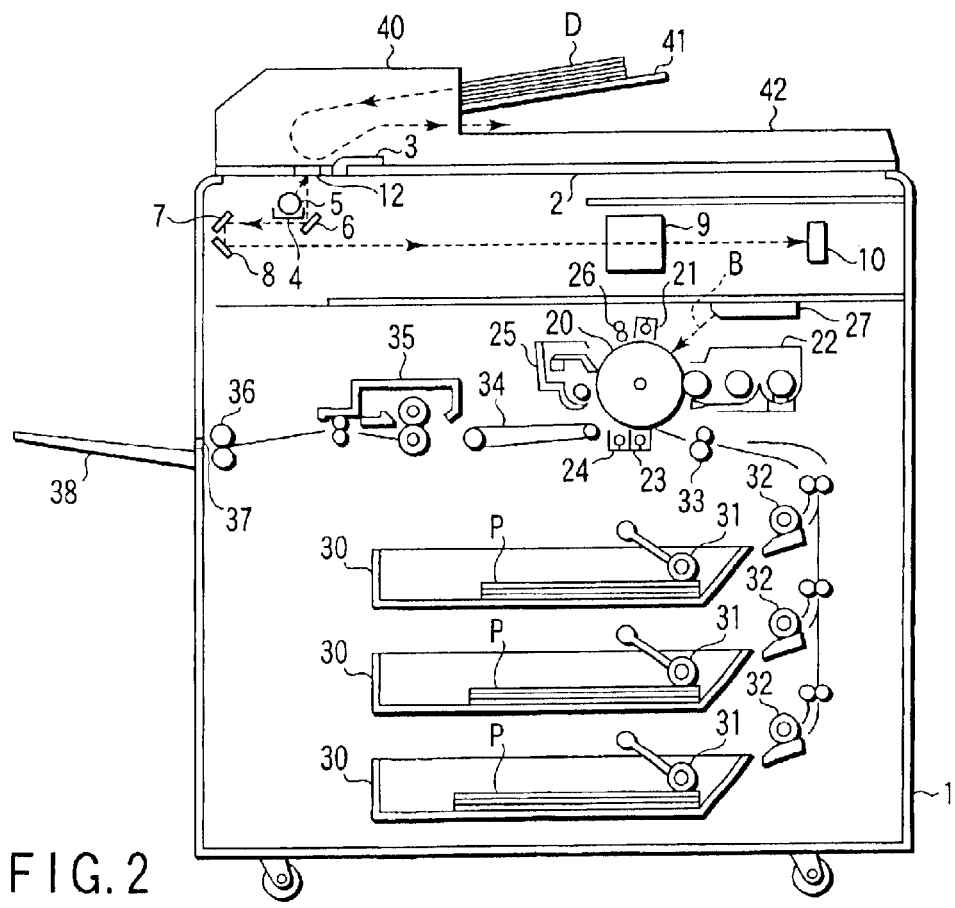
FIG. 2 is a sectional view showing an inner constitution of the embodiments.

As shown in FIGS. 1 and 2, a transparent base (glass plate) 2 for laying a draft is disposed in an upper surface portion of a main body 1. An indicator 3 is disposed in one side portion of the draft base 2. A step portion between the indicator 3 and draft base 2 is a reference position for setting the draft. A plurality of draft sensors 11 described later are disposed on an undersurface side of the draft base 2. The draft sensors 11 optically detect presence/absence and size of a draft D set on the draft base 2.

A carriage 4 is disposed on the undersurface side of the draft base 2, and an exposure lamp 5 is disposed in the carriage 4. The carriage 4 and exposure lamp 5 constitute exposure means. The carriage 4 moves (reciprocates) along the undersurface of the draft base 2. While the carriage 4 reciprocates along the draft base 2, the exposure lamp 5 is lit, and the draft D laid on the draft base 2 is exposed to light. By this exposure, a reflected light image from the draft D is obtained, and is projected onto a charge coupled device (CCD) 10 by reflection mirrors 6, 7, 8 and a lens block 9 for varying magnification. The CCD 10 includes a large number of photoelectric conversion elements in light receiving regions, line-scans these light receiving regions, repeats the line scanning, and thereby outputs an image signal corresponding to an image of the draft D.

The image signal outputted from the CCD 10 is amplified by a signal processing section 73 described later, and converted to a digital signal. The digital signal is appropriately processed by an image processing section 55, and thereafter supplied to a laser unit 27. The laser unit 27 emits a plurality of laser beams B which turn on/off in response to an input signal.

A window 12 for reading the draft is disposed in a position disposed adjacent to the indicator 3 of the draft base 2. The window 12 has a dimension/shape corresponding to a length of the indicator 3 in a longitudinal direction. Moreover, an automatic draft feed device (ADF) 40 which also serves as a draft base cover is disposed on the draft base 2, indicator 3, and window 12. The automatic draft feed device 40 includes a tray 41 for laying the draft. A plurality of drafts D set on the tray 41 are fed into the window 12 and pass the window 12. The passed draft D is discharged onto a tray 42. When the automatic draft feed device 40 operates, the exposure lamp 5 emits light in a position disposed opposite to the window 12, and the window 12 is irradiated with the light. The draft D passed over the window 12 is exposed to the light. By this exposure, the reflected light image from the draft D is obtained, and projected onto the CCD 10 by the reflection mirrors 6, 7, 8 and lens block 9 for varying the magnification.

In the upper surface portion of the main body 1, a control panel 13, which is operation means for setting operation conditions, is disposed in a position where the automatic draft feed device 40 does not cover. The control panel 13 includes a liquid crystal display portion of a touch panel system, ten keys for inputting numeric values, an all reset key, a copy key, a stop key, and the like. In the liquid crystal display portion, information can be inputted by a touch operation, and various types of information, including the inputted information, can be displayed. When the liquid crystal display portion is touched, it is possible to set a type or condition of image formation and to designate the size of a sheet P, described later, and to input various codes for maintenance service.

On the other hand, a photosensitive drum 20 is rotatably disposed substantially in a middle portion in the main body 1. Around the photosensitive drum 20, a charging unit 21, developing unit 22, transfer unit 23, release unit 24, cleaner 25, and static eliminator 26 are successively disposed.

The charging unit 21 applies a high-level bias voltage to the photosensitive drum 20, and charges the surface of the photosensitive drum 20 with a static charge. The charged surface of the photosensitive drum 20 is irradiated with the laser beam B emitted from the laser unit 27, which is a spot light, through a space between the charging unit 21 and developing unit 22. By this laser beam B, the surface of the photosensitive drum 20 is main-scanned (line-scanned) in one direction, and the main scanning is repeated with the rotation of the photosensitive drum 20. By the sub-scanning, an electrostatic latent image corresponding to a read image from the draft D is formed on the surface of the photosensitive drum 20.

The developing unit 22 includes: a stirring roller 22a for stirring toner which is a developing agent, and a carrier; a feed roller 22b for feeding the toner (including the carrier) stirred by the stirring roller 22a toward the photosensitive drum 20; and a slide contact roller 22c which slide-contacts the surface of the photosensitive drum 20 and which attaches the toner fed by the feed roller 22b onto the surface of the photosensitive drum 20. The unit applies the bias voltage to the toner for developing the image. Although not shown, a toner cartridge is detachably attached to the developing unit 22. When the toner cartridge is attached, the developing unit 22 is supplied with toner.

The electrostatic latent image on the photosensitive drum 20 receives the toner from the developing unit 22, and is developed to form a visible image. The visible image is transferred to a sheet P supplied from sheet cassettes 30 described later. The sheet in which the image is printed in this manner is released from the photosensitive drum 20 by the release unit 24. The developing agent and charge remain on the surface of the photosensitive drum 20 from which the sheet P is released. The residual developing agent is removed by the cleaner 25. The residual charge is removed by the static eliminator 26.

The sheet P released from the photosensitive drum 20 is fed to a fixing unit 35 by a conveyor belt 34. The fixing unit 35 fixes the transferred image on the sheet P by heat. The fixed sheet P is fed to a discharge port 37 by discharge rollers 36, and discharged onto a tray 38 outside the main body 1 via the discharge port 37.

A plurality of cassettes containing sheets, i.e., sheet cassettes 30, are disposed in a bottom of the main body 1. These sheet cassettes 30 contain a number of differently-sized sheets. When the copy key of the control panel 13 is pressed, the sheets P are taken out of the sheet cassettes 30 sheet by sheet. Pickup rollers 31 are disposed for taking out the sheets. The sheets P are then separated from the sheet cassettes 30 by separating units 32, and fed to resist rollers 33. The resist rollers 33 feed the sheet P between the photosensitive drum 20 and transfer unit 23 at a timing according to rotation of the photosensitive drum 20.

A power switch 39 is disposed on the side of the main body 1.

Figure 3:
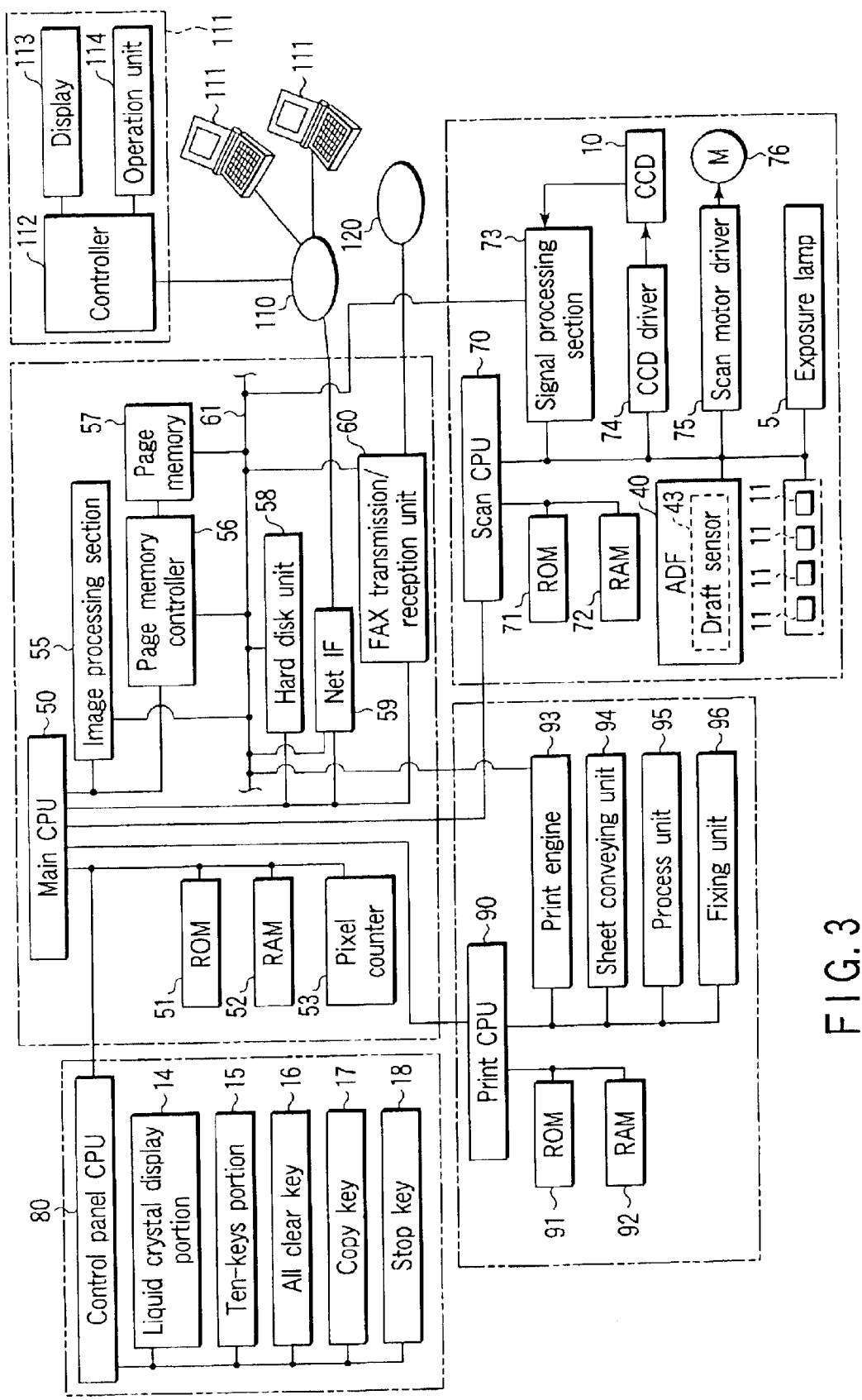
FIG. 3 is a block diagram of a control circuit of the embodiments.

The entire control circuit of the apparatus is shown in FIG. 3.

A main CPU 50 is connected to a scan CPU 70, control panel CPU 80, and print CPU 90. The main CPU 50 generally controls the scan CPU 70, control panel CPU 80, and print CPU 90. The main CPU includes: control means of a copy mode in response to an operation of the copy key; control means of a printer mode in response to an image input into a net interface 59 described later; and control means of a facsimile (FAX) mode in response to image reception in a FAX transmission/reception unit 60 described later.

Moreover, the main CPU 50 is connected to: a ROM 51 for storing a control program; a RAM 52 for storing data; a pixel counter 53; an image processing section 55; a page memory controller 56; a hard disk unit 58; the net interface 59; and the FAX transmission/reception unit 60. The page memory controller 56 controls write and read of image data with respect to a page memory 57. Furthermore, an image data bus 61 connects the image processing section 55, page memory controller 56, page memory 57, hard disk unit 58, net interface 59, and FAX transmission/reception unit 60 to one another.

The image processing section 55 subjects the read image from the draft D, for example, to shading correction, various filtering processes, gradation process, and gamma correction.

The net interface 59 functions as an input section for the printer mode, to which the image (image data) transmitted from an external apparatus is inputted. This net interface 59 is connected to a communication network 110, such as LAN and Internet. The communication network 110 is connected to external apparatuses such as a plurality of personal computers 111. Each of these personal computers 111 includes a controller 112, display 113, and operation unit 114.

The FAX transmission/reception unit 60 is connected to a telephone circuit 120, and functions as a reception section for the facsimile mode, which receives the image (image data) facsimile-transmitted through the telephone circuit 120.

The scan CPU 70 is connected to: a ROM 71 for storing a control program; a RAM 72 for storing the data; the signal processing section 73 which processes an output of the CCD 10 to supply the output to the image data bus 61; a CCD driver 74; a scan motor driver 75; the exposure lamp 5; the automatic draft feed device 40; and the plurality of draft sensors 11. The CCD driver 74 drives the CCD 10. The scan motor driver 75 drives a scan motor 76 for driving the carriage. The automatic draft feed device 40 includes a draft sensor 43 for detecting the draft D set in the tray 41 and the size of the draft. The scan CPU 70 and peripheral constitution are mainly used to constitute a reading section for the copy mode, which optically reads the image of the draft D.

The control panel CPU 80 is connected to a liquid crystal display portion 14, ten keys 15, all reset key 16, copy key 17, and stopper key 18 in the control panel 13.

The print CPU 90 is connected to a ROM 91 for storing the control program, a RAM 92 for storing the data, a print engine 93, a sheet conveying unit 94, a process unit 95, and a fixing unit 96. The print engine 93 is constituted of the laser unit 27 and a driving circuit of the unit. The sheet conveying unit 94 is constituted of a sheet conveying mechanism extending to the tray 38 from the sheet cassette 30, and the driving circuit of the mechanism. The process unit 95 is constituted of the photosensitive drum 20, and a peripheral section of the drum. The fixing unit 96 is constituted of the fixing unit 35, and the driving circuit of the unit. The print CPU 90 and the peripheral constitution are used as the main body to constitute a print section which prints the image processed by the image processing section 55 onto the sheet P.

Figure 4:
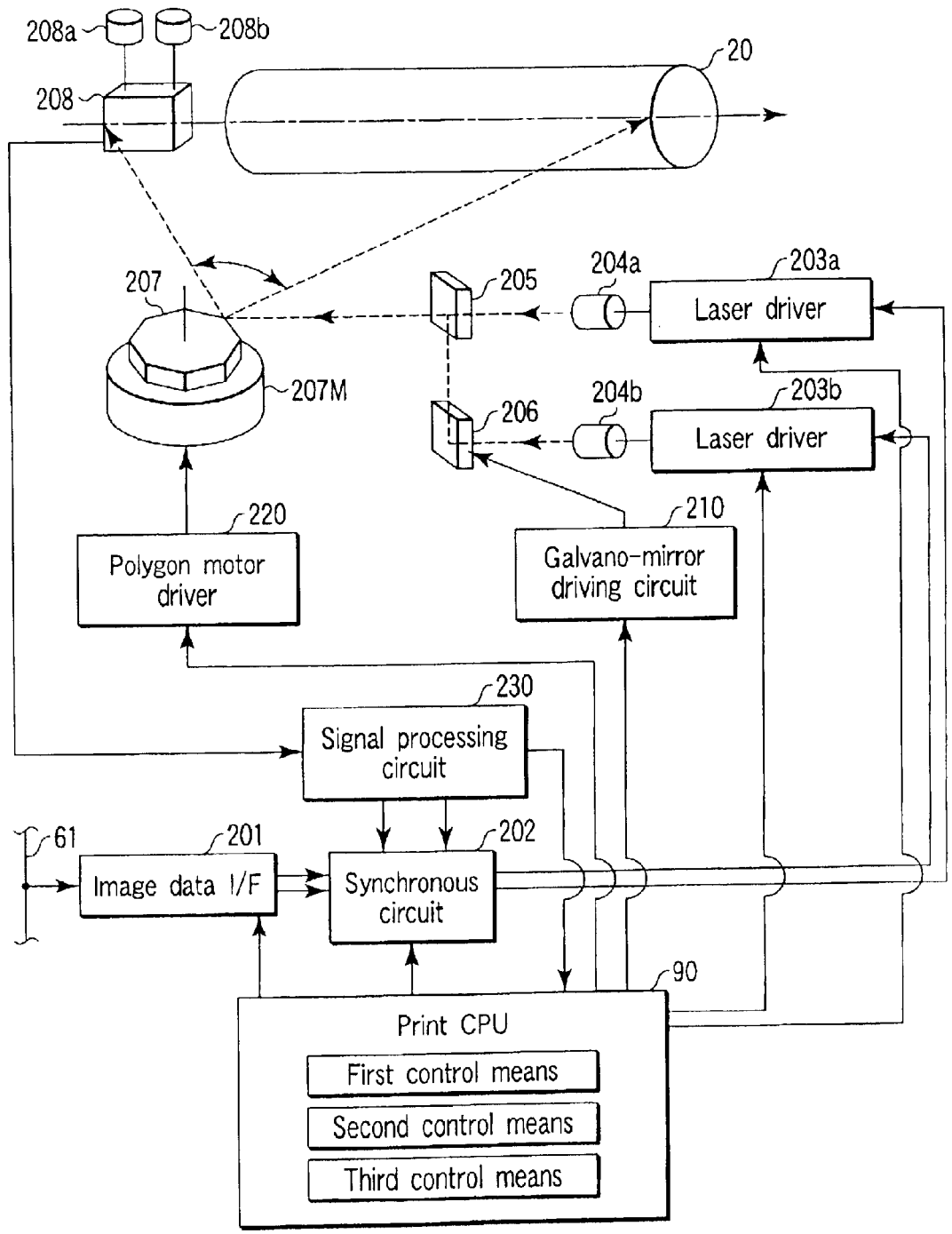
FIG. 4 is a block diagram showing a constitution of a print engine in first, second, fourth, and fifth embodiments.

FIG. 4 shows the constitution of a main part of the print engine 93.

The image data on the image data bus 61, supplied from the image processing section 55, is inputted into an image data interface (I/F) 201. The image data interface 201 distributes the inputted image data into two systems for laser oscillators 204a, 204b described later. This image data for two systems is supplied to a synchronous circuit 202.

The synchronous circuit 202 generates a clock signal synchronized with a detection timing of the laser beam B by a photodetector 208 described later, modulates the image data for two systems supplied from the image data interface 201 in response to the generated clock signal, and outputs a laser modulation signal. These outputs are supplied to laser drivers 203a, 203b. It is to be noted that the synchronous circuit 202 further operates the laser oscillators 204a, 204b to secure a sample time for controlling an output power of laser beam B, when the laser beam B is in a non-image forming region.

The laser drivers 203a, 203b drive two beam generators such as the laser oscillators 204a, 204b in response to each laser modulation signal outputted from the synchronous circuit 202. These laser drivers 203a, 203b and laser oscillators 204a, 204b constitute the laser unit 27.

The laser beam B emitted from the laser oscillator 204a passes through a half mirror 205 to hit a polygon mirror (rotary polygonal mirror) 207. The laser beam B emitted from the laser oscillator 204b hits a galvano-mirror 206 and is reflected. Next, the beam hits the half mirror 205 and is reflected to hit the polygon mirror 207.

The polygon mirror 207 receives a power from a motor 207M to rotate. Two laser beams B, which have hit the polygon mirror 207, are reflected by the polygon mirror 207, and expose/scan the surface of the photosensitive drum 20 along the axial direction of the photosensitive drum 20 with the rotation of the polygon mirror 207. The linear scanning along the axial direction of the photosensitive drum 20 is referred to as main scanning. The main scanning is repeatedly executed with the rotation of the photosensitive drum 20. A movement direction (direction crossing at right angles to the direction of the main scanning) of each main scanning repeated on the photosensitive drum 20 is referred to as a sub-scanning direction.

The main scanning by two laser beams B is simultaneously performed. Accordingly, without increasing rotation speed of the polygon mirror 207, it is possible to form an image at high speed.

The galvano-mirror 206 incorporates a coil for driving, and rotates by an amount corresponding to a level of driving current inputted into the coil so that a reflection angle changes. By the change of the reflection angle, it is possible to adjust the scanning position of the laser beam B emitted from the laser oscillator 204b in the sub-scanning direction. When the reflection angle of the galvano-mirror 206 is adjusted by the print CPU 90 and a galvano-mirror driving circuit 210, an interval between two laser beams B guided into the photosensitive drum 20 is maintained to be constant, and the scanning position of the laser beam B with respect to the photosensitive drum 20 is converged in a predetermined position.

It is to be noted that for the laser beam B emitted from the laser oscillator 204a, since the position of the laser oscillator 204a is fixed as a reference position with high accuracy, the galvano-mirror is not prepared.

Ranges of scanning of the respective laser beams B emitted from the laser oscillators 204a, 204b include the whole region (image forming region+non-image forming region) to the other end from one end along the axial direction of the photosensitive drum 20, and also include a predetermined region (non-image forming region) before one end of the photosensitive drum 20. The photodetector 208 is disposed in this predetermined region.

The photodetector 208 outputs an electric signal on receiving the laser beam B, and functions as detection means for detecting the scanning position of the laser beam B in the rotation direction (sub-scanning direction) of the photosensitive drum 20. The output is supplied to a signal processing circuit 230. The signal processing circuit 230 processes the output signal of the photodetector 208 to output a signal indicating the scanning position of the laser beam B. It is to be noted that motors 208a, 208b for adjusting inclination of a photo-detecting surface so as to match the surface of the photosensitive drum 20 are attached to the photodetector 208.

The print CPU 90 is connected to: the galvano-mirror driving circuit 210 for driving the galvano-mirror 206; a polygon motor driver 220 for driving the motor 207M of the polygon mirror 207; and the signal processing circuit 230.

Figure 5:
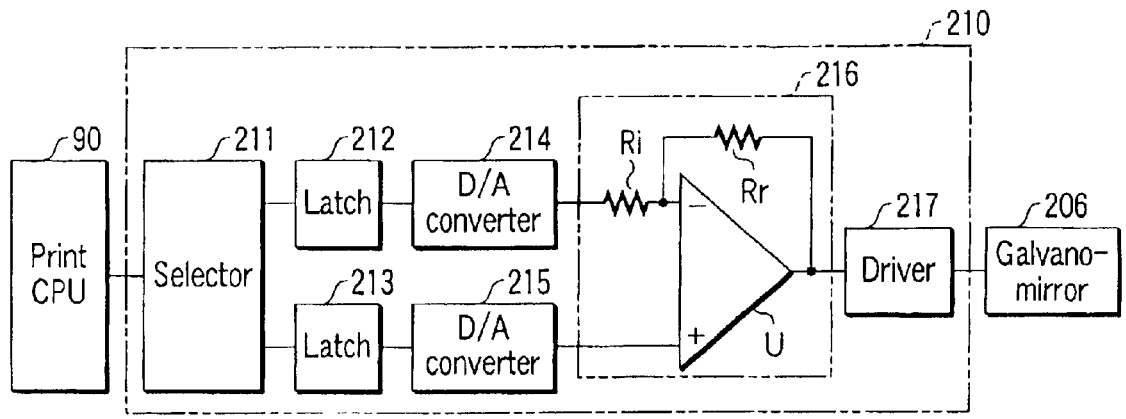
FIG. 5 is a block diagram showing a constitution of a galvano-mirror driving circuit in the respective embodiments

As shown in FIG. 5, the galvano-mirror driving circuit 210 includes: a selector 211; latches 212, 213; a digital/analog converter of eight-bits type for fine adjustment (hereinafter referred to simply as the D/A converter for the fine adjustment) 214; a digital/analog converter of eight-bits type for coarse adjustment (hereinafter referred to simply as the D/A converter for the coarse adjustment) 215; an amplification circuit 216; and a driver 217.

The selector 211 allocates 16-bits digital data for indicating an angle, supplied from the print CPU 90, into digital data of low eight bits for fine adjustment, and digital data of high eight bits for coarse adjustment. The latches 212, 213 temporarily hold the digital data allocated by the selector 211.

The D/A converter for the fine adjustment 214 outputs the voltage signal of a level corresponding to the digital data of eight bits for the fine adjustment, which is temporarily held in the latch 212. The D/A converter for the coarse adjustment 215 outputs the voltage signal of the level corresponding to the digital data of eight bits for the coarse adjustment, which is temporarily held in the latch 213.

The amplification circuit 216 outputs the voltage of the level corresponding to the output voltages of the D/A converters 214 and 215 as a driving voltage with respect to the galvano-mirror 206. The circuit is constituted of an operation amplifier U, input resistor Ri, and feedback resistor Rr. Assuming that the output voltage of the D/A converter 214 is Vx, the output voltage of the D/A converter 215 is Vy, the resistance value of the input resistor Ri is Ri as such, and the resistance value of the feedback resistor Rr is Rr as such, an output voltage Vo of the amplification circuit 216 is represented by the following equation.

$$Vo=(Rr/Ri)\cdot Vx+(1+Rr/Ri)\cdot Vy$$

The driver 217 amplifies the output voltage of the amplification circuit 216.

The print CPU 90 includes the following means (1) to (5) which are main functions relating to control of the print engine 93:

(1) means for rotating/driving the polygon mirror 207 at a speed lower than that at a conventional image forming time, successively operating the laser oscillators 204a, 204b, and detecting the scanning positions of the laser beams B emitted from the laser oscillators 204a, 204b by the photodetector 208 and signal processing circuit 230;

(2) means for variably controlling emission outputs of laser oscillators 31a, 31b in response to latent image forming conditions of the photosensitive drum 20 at a scanning position detection time and image formation time;

(3) first control means for increasing/decreasing/controlling the input value X of the digital data with respect to the D/A converter for the fine adjustment 214 in a state in which an input value Y of the digital data with respect to the D/A converter for the coarse adjustment 215 is set to a predetermined value (any of Y1, Y2, . . . ) so as to rotate the galvano-mirror 206 in a direction in which the scanning position of the laser beam B emitted from the laser oscillator 204b and reflected by the galvano-mirror 206 in the detected scanning positions of the respective laser beams B is within a predetermined position (the position maintained at a given interval with respect to the scanning position of the laser beam B emitted from the laser oscillator 204a whose reference position is fixed);

(4) second control means for shifting the input value X to an input upper limit value "FFH" which is the other limit value of the D/A converter for the fine adjustment 214 and for shifting the input value Y of the digital data with respect to the D/A converter for the coarse adjustment 215 by one step in an increase direction, when the input value X of the digital data with respect to the D/A converter for the fine adjustment 214 is decreased to reach an input lower limit value "00H" which is one limit value of the D/A converter for the fine adjustment 202 during the control by the first control means; and (5) third control means for shifting the input value X to the input lower limit value "00H" of the D/A converter for the fine adjustment 214 and for shifting the input value Y of the digital data with respect to the D/A converter for the coarse adjustment 215 by one step in a decrease direction, when the input value X of the digital data with respect to the D/A converter for the fine adjustment 214 is increased to reach the input upper limit value "FFH" of the D/A converter for the fine adjustment 202 during the control by the first control means.

Next, the function of the above-described constitution will be described.

When the draft D is set on the draft base 2, a set state is detected by the respective draft sensors 11, and the size of the set draft D is detected by the respective draft sensors 11. Subsequently, when the copy key 17 is turned on, the image of the draft D on the draft base 2 is read, and the read image (image data) is stored in the page memory 57.

When the image (image data) transmitted from the personal computers 111 via the communication network 110 is inputted into the net interface 59, the input image (image data) is stored in the page memory 57.

When the image (image data) facsimile-transmitted through the telephone circuit 120 is received by the FAX transmission/reception unit 60, the received image (image data) is stored in the page memory 57.

The image stored in the page memory 57 is image-processed by the image processing section 55. The laser oscillators 204a, 204b of the laser unit 27 turn on/off in response to the processed image, while the laser beams B emitted from the laser oscillators 204a, 204b main-scan and sub-scan on the photosensitive drum 20, the electrostatic latent image is formed on the photosensitive drum 20.

The electrostatic latent image formed on the photosensitive drum 20 receives the toner from the developing unit 22, and is developed to form the visible image. The visible image is transferred to the sheet P by the transfer unit 23. The sheet P on which the image is printed is released from the photosensitive drum 20 by the release unit 24, and is conveyed to the fixing unit 35 by the conveyor belt 34. The sheet P fixed by the fixing unit 35 is fed to the discharge port 37 by the discharge rollers 36, and discharged to the tray 38 outside the main body 1 via the discharge port 37.

At a warming-up time or stand-by time, the laser oscillators 204a, 204b successively operate, and the scanning positions of the respective laser beams B emitted from the laser oscillators 204a, 204b are detected by the photodetector 208 and signal processing circuit 230.

Subsequently, the input value X of the digital data with respect to the D/A converter for the fine adjustment 214 is increased/decreased/controlled (feedback-controlled) in the state in which the input value Y of the digital data with respect to the D/A converter for the coarse adjustment 215 is set to the predetermined value (any of Y1, Y2, . . . ) so as to rotate the galvano-mirror 206 in the direction in which the laser beam B emitted from the laser oscillator 204b and reflected by the galvano-mirror 206 in the scanning positions of the respective laser beams B detected by the photodetector 208 is within the predetermined position (the position maintained at the given interval with respect to the scanning position of the laser beam B emitted from the laser oscillator 204a whose reference position is fixed).

The input value X is shifted to the input upper limit value "FFH" of the D/A converter for the fine adjustment 214 and also the input value Y of the digital data with respect to the D/A converter for the coarse adjustment 215 is shifted by one step in the increase direction, when the input value X of the digital data with respect to the D/A converter for the fine adjustment 214 is decreased to reach the input lower limit value "00H" of the D/A converter for the fine adjustment 214.

The input value X is shifted to the input lower limit value "00H" of the D/A converter for the fine adjustment 214 and also the input value Y of the digital data with respect to the D/A converter for the coarse adjustment 215 is shifted by one step in the decrease direction, when the input value X of the digital data with respect to the D/A converter for the fine adjustment 214 is increased to reach the input upper limit value "FFH" of the D/A converter for the fine adjustment 214.

Figure 6:
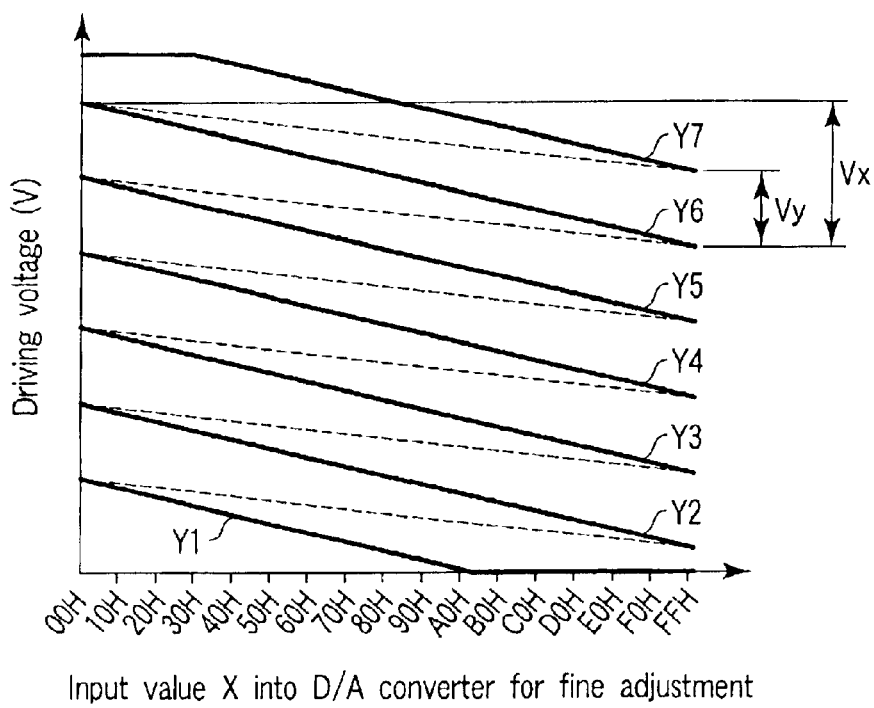
FIG. 6 is a diagram showing a relation between input values X, Y with respect to D/A converters and a driving voltage with respect to a galvano-mirror in the embodiments.

In this manner, as shown in FIG. 6, in accordance with the input value X of the digital data with respect to the D/A converter for the fine adjustment 214, the input values Y1, Y2, . . . of the digital data with respect to the D/A converter for the coarse adjustment 215 are used as parameters, and the driving voltage changes with respect to the galvano-mirror 206.

For the output voltage of the D/A converter for the coarse adjustment 215, as seen from FIG. 6, a change width Vy at a time when the input value of the digital data shifts by one step is smaller than a maximum change width Vx of the output voltage of the D/A converter for the fine adjustment 214. Accordingly, even when the input value of the digital data with respect to the D/A converter for the coarse adjustment 215 is shifted by one step, the driving voltage with respect to the galvano-mirror 206 can be continuously changed.

A voltage adjustment resolution at this time depends on a constant "Rr/Ri" of the amplification circuit 216. Therefore, to adjust the voltage at a resolution higher than that of the D/A converter 214, the constant "Rr/Ri" of the amplification circuit 216 may be set to "1" or less.

As described above, when the D/A converter for the fine adjustment 214 having a resolution of eight bits and the D/A converter for the coarse adjustment 215 having a resolution of eight bits are used to drive the galvano-mirror 206, the scanning position of the laser beam B can be adjusted with the high resolution and accuracy without narrowing the adjustment range. Especially, the D/A converter of the eight-bits type is inexpensive. Cost reduction is achieved as compared with a related art in which one D/A converter of the 16-bits type is used.

[2] A second embodiment will be described.

Figure 7:
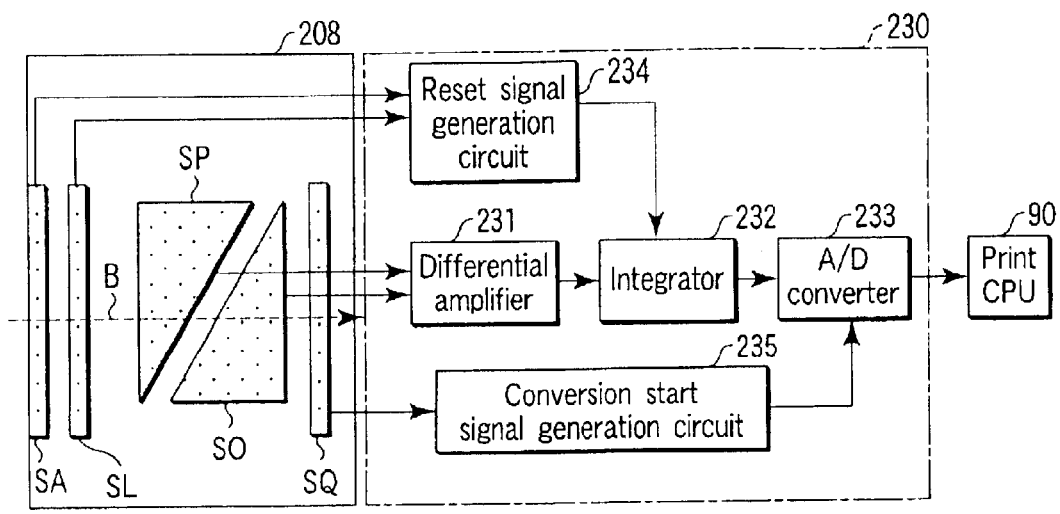
FIG. 7 is a block diagram showing constitutions of a photo-detection unit and signal processing circuit in the second embodiment.

In the second embodiment, the constitution shown in FIG. 7 is used as the photodetector 208 and signal processing circuit 230.

The photodetector 208 includes: two photoelectric conversion elements (first photoelectric conversion elements) SA, SL for detecting the incoming laser beam B into the photodetector 208; two photoelectric conversion elements (second photoelectric conversion elements) SP, SO in which the sizes of light receiving regions continuously change in opposite directions in the direction crossing at right angles to the scanning direction of the laser beam B; and a photoelectric conversion element (third photoelectric conversion element) SQ for detecting the outgoing laser beam B from the photodetector 208. These photoelectric conversion elements are successively arranged along the scanning direction of the laser beam B.

The light receiving regions of the photoelectric conversion elements SA, SL, SQ have strip-shaped patterns long in the direction crossing at right angles to the scanning direction of the laser beam B so that the scanning position of the laser beam B can be detected in a broad range. The light receiving regions of the photoelectric conversion elements SP, SO have mutually contrasting triangular patterns.

The signal processing circuit 230 includes: a differential amplifier 231 which outputs the voltage of the level corresponding to a difference between the output signals of the photoelectric conversion elements SP, SO; an integrator 232 which integrates the output voltage of the differential amplifier 231; an analog/digital converter (hereinafter referred to simply as A/D converter) 233 which converts the output voltage of the integrator 232 into the digital data; a reset signal generation circuit 234 which generates a reset signal (pulse signal) with respect to the integrator 232 in response to the output signals of the photoelectric conversion elements SA, SL; and a conversion start signal generation circuit 235 which generates a conversion start signal with respect to the analog/digital converter in response to the output signal of the photoelectric conversion element SQ. The digital data of the A/D converter 233 is supplied as the signal indicating the scanning position of the laser beam B to the print CPU 90.

The other constitution is the same as that of the first embodiment.

According to the above-described constitution, as shown by a broken line in FIG. 7, while the laser beam B passes through the photodetector 208, light receiving outputs (currents) are successively generated from the photoelectric conversion elements SA, SL, SP, SO, SQ. The light receiving outputs are converted to voltage signals by the respective converters (not shown).

The laser beam B first passes through the photoelectric conversion element SA, and next passes through the photoelectric conversion element SL. The reset signal (pulse signal) having a time width corresponding to a period from when the photoelectric conversion element SA receives the light until the photoelectric conversion element SL receives the light is generated by the reset signal generation circuit 234, and the integrator 232 is reset by the reset signal.

The laser beam B which has passed through the photoelectric conversion element SL subsequently passes through the photoelectric conversion elements SP, SO. When the pass position exists in an upper part of FIG. 7, a light receiving time of the photoelectric conversion element SP lengthens, and the light receiving time of the photoelectric conversion element SO relatively shortens. The difference between the output signals in accordance with the light receiving time of these photoelectric conversion elements SP, SO corresponds to the pass position of the laser beam B.

Figure 8:
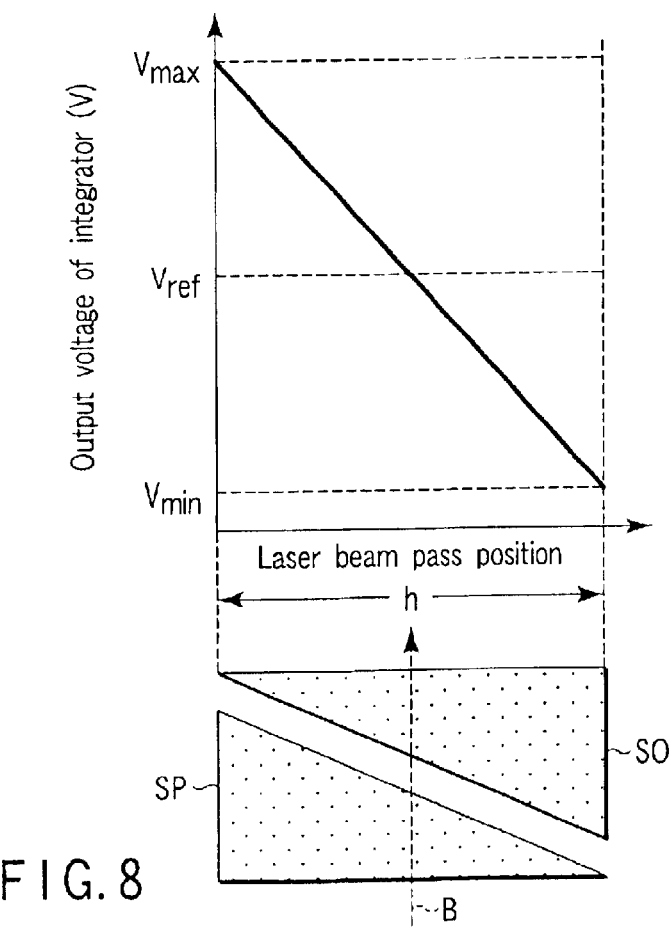
FIG. 8 is a diagram showing a relation between a pass position of a laser beam B in the photo-detection unit of FIG. 7 and an output voltage of an integration unit in the signal processing circuit.

Moreover, the voltage of the level corresponding to the difference between the light receiving outputs of the photoelectric conversion elements SP, SO is outputted from the differential amplifier 231, and the output voltage of the differential amplifier 231 is integrated by the integrator 232. As shown in FIG. 8, the output voltage of the integrator 232 linearly changes between a minimum voltage Vmin and maximum voltage Vmax in accordance with the pass position of the laser beam B in the region (width h) of the photoelectric conversion elements SP, SO. When the pass position of the laser beam B exists in an upper position of FIG. 7, the output voltage of the integrator 232 indicates a higher level. When the pass position of the laser beam B is in the middle, the output voltage of the integrator 232 is Vref.

When the laser beam B passed through the photoelectric conversion elements SP, SO hits the photoelectric conversion element SQ, a conversion start signal is generated by the conversion start signal generation circuit 235 in the light receiving timing of the photoelectric conversion element SQ. By the conversion start signal, the output voltage of the integrator 232 is converted to the digital data by the A/D converter 233. The digital data is supplied to the print CPU 90 as the signal which indicates the scanning position of the laser beam B.

When the photodetector 208 and signal processing circuit 230 are employed, the scanning position of the laser beam B can accurately be detected.

The pass position of the laser beam B can be captured only by the output voltage of either the photoelectric conversion element SP or SO. However, when the pass position of the laser beam B is grasped from the difference between the light receiving outputs of two photoelectric conversion elements SP, SO, an influence of noise from the outside is removed by two photoelectric conversion elements SP, SO in an offset manner, and the scanning position of the laser beam B can be detected with high accuracy.

The other actions and effects are the same as those of the first embodiment.

[3] A third embodiment will be described.

Figure 9:
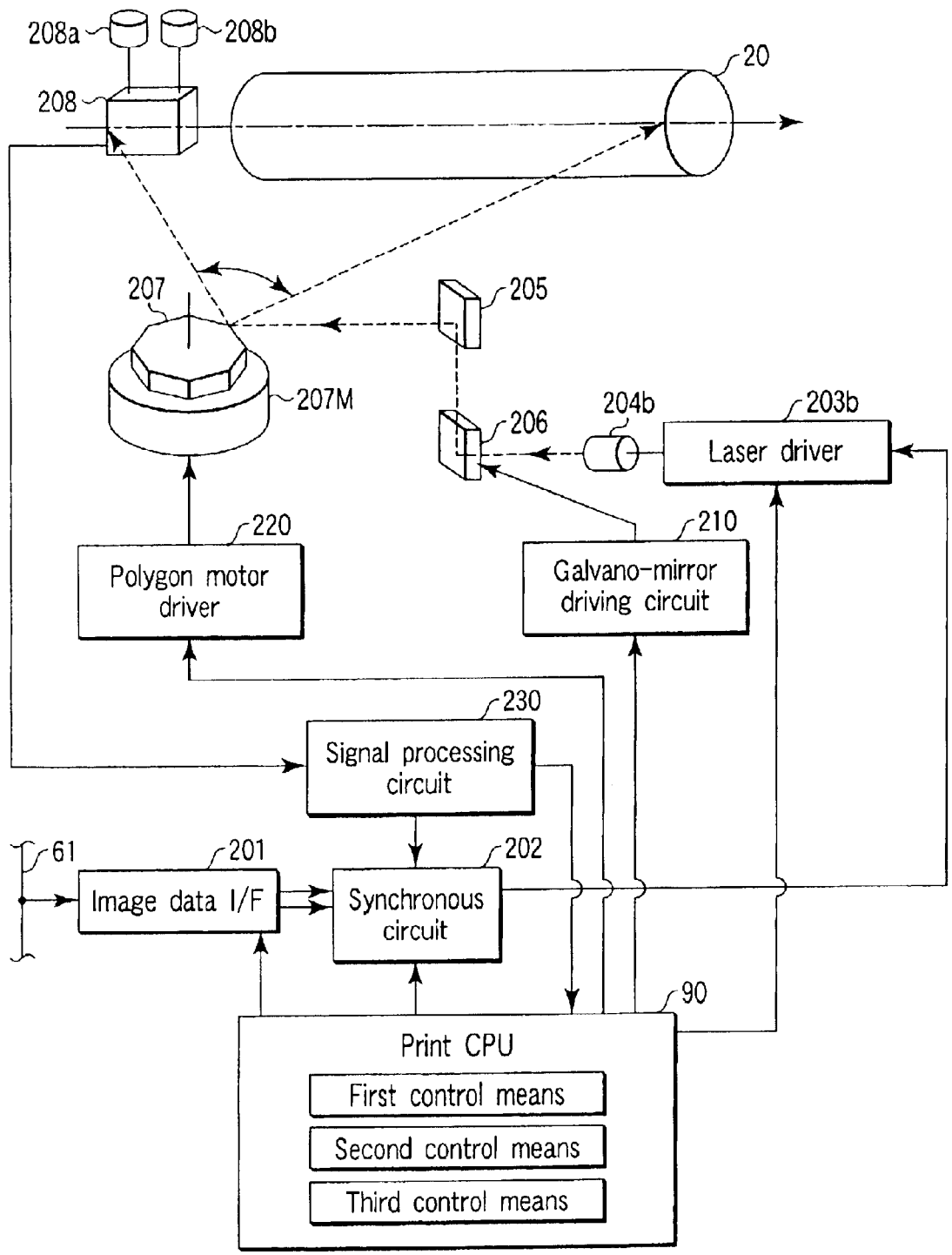
FIG. 9 is a block diagram showing the constitution of the print engine in a third embodiment.

In the first and second embodiments, the example of the image forming apparatus of the multi-beam type using a plurality of laser beams B has been described. However, as shown in FIG. 9, the present invention can similarly be carried out even in the image forming apparatus of a single beam type in which only one laser beam B is used.

In this case, the laser driver 203a and laser oscillator 204a are eliminated, and the scanning position of the laser beam B emitted from the laser oscillator 204b and then from the galvano-mirror 206 is detected by the photodetector 208 and signal processing circuit 230. The galvano-mirror 206 is driven/controlled so that the scanning position converges to a pre-defined position.

The other constitution, function, and effect are the same as those of the first or second embodiment.

[4] A fourth embodiment will be described.

Figure 10:
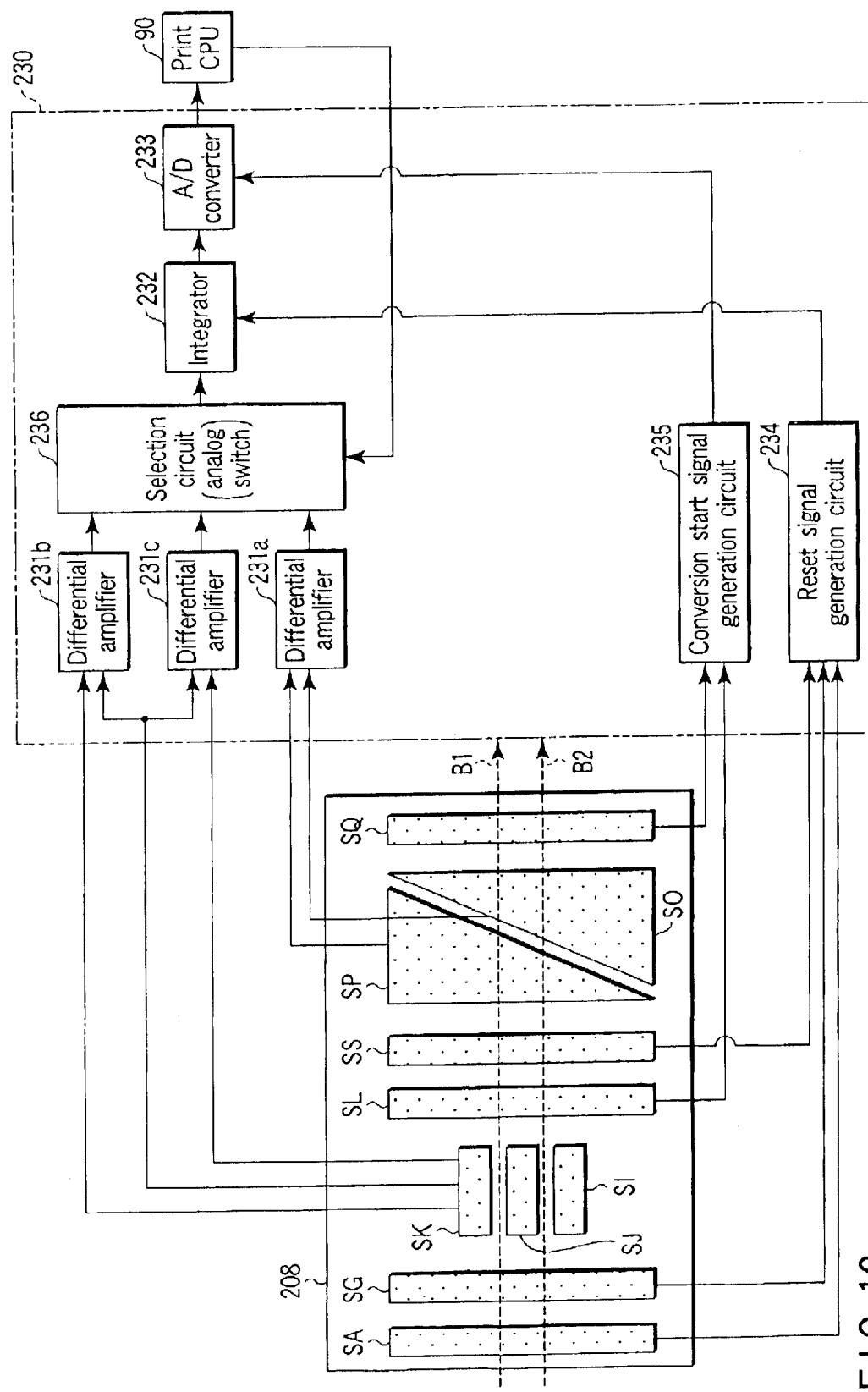
FIG. 10 is a block diagram showing the constitutions of the photo-detection unit and signal processing circuit in the fourth embodiment.

In the fourth embodiment, the constitution shown in FIG. 10 is used as the photodetector 208 and signal processing circuit 230.

The photodetector 208 includes: two photoelectric conversion elements SA, SG for detecting the incoming laser beam B into the photodetector 208; photoelectric conversion elements (first, second, third photoelectric conversion elements) SK, SJ, SI disposed in parallel with one another at given intervals in the direction crossing at right angles to the scanning direction of the laser beam B; two photoelectric conversion elements SL, SS for detecting left of the laser beam B; two photoelectric conversion elements (fourth photoelectric conversion elements) SP, SO in which the sizes of the light receiving regions continuously change in the opposite directions in the direction crossing at right angles to the scanning direction of the laser beam B; and the photoelectric conversion element SQ for detecting the outgoing laser beam B from the photodetector 208.

The light receiving regions of the photoelectric conversion elements SA, SG, SL, SS, SQ have the strip-shaped patterns long in the direction crossing at right angles to the scanning direction of the laser beam B, so that the scanning position of the laser beam B can be detected in a broad range. The light receiving regions of the photoelectric conversion elements SP, SO have the mutually contrasting triangular patterns.

The signal processing circuit 230 includes: a differential amplifier 231a which outputs the voltage of the level corresponding to the difference between the output signals of the photoelectric conversion elements SP, SO; a differential amplifier 231b which outputs the voltage of the level corresponding to the difference between the output signals of the photoelectric conversion elements SK, SJ; a differential amplifier 231c which outputs the voltage of the level corresponding to the difference between the output signals of the photoelectric conversion elements SJ, SI; a selection circuit (analog switch) 234 which selects/outputs any of the output voltages of the differential amplifiers 231a, 231b, 231c in response to a command from the print CPU 90; the integrator 232 which integrates the output voltage selected by the selection circuit 234; the analog/digital converter (hereinafter referred to simply as the A/D converter) 233 which converts the output voltage of the integrator 232 into the digital data; the reset signal generation circuit 236 which generates the reset signal (pulse signal) with respect to the integrator 232 in response to the output signals of the photoelectric conversion elements SA, SG and which also generates the reset signal (pulse signal) with respect to the integrator 232 in response to the output signals of the photoelectric conversion elements SA, SS; and the conversion start signal generation circuit 235 which generates the conversion start signal with respect to the analog/digital converter in response to the output signal of the photoelectric conversion element SL and which also generates the conversion start signal with respect to the analog/digital converter in response to the output signal of the photoelectric conversion element SQ. The digital data of the A/D converter 233 is supplied as the signal indicating the scanning position of the laser beam B to the print CPU 90.

The other constitution is the same as that of the first embodiment.

According to the above-described constitution, as shown by a broken line in FIG. 10, while the laser beam B passes through the photodetector 208, the light receiving outputs (currents) are successively generated from the respective photoelectric conversion elements. The light receiving outputs are converted to the voltage signals by the respective converters (not shown).

The laser beam B first passes through the photoelectric conversion element SA, and next passes through the photoelectric conversion element SG. The reset signal (pulse signal) having the time width corresponding to the period from when the photoelectric conversion element SA receives the light until the photoelectric conversion element SG receives the light is generated by the reset signal generation circuit 236, and the integrator 232 is reset by the reset signal.

The laser beam B which has passed through the photoelectric conversion element SG subsequently passes through the regions of the photoelectric conversion elements SK, SJ, SI. At this time, when the laser beam B passes over any of the photoelectric conversion elements SK, SJ, SI, the light receiving output is obtained from the passed photoelectric conversion element. When the laser beam B passes over any of the photoelectric conversion elements SK, SJ, SI, the light receiving output cannot be obtained from the photoelectric conversion element.

Subsequently, the voltage of the level corresponding to the difference between the light receiving outputs of the photoelectric conversion elements SK, SJ is outputted from the differential amplifier 231b, and the output voltage of the differential amplifier 231b is selected by the selection circuit 234 and integrated by the integrator 232. As shown in FIG. 11, the output voltage of the integrator 232 changes in accordance with the pass position of the laser beam B between the photoelectric conversion elements SK, SJ. When the pass position of the laser beam B is in the center position between the photoelectric conversion elements SK, SJ as in a laser beam B1 shown by a shown broken line, the output voltage of the integrator 232 indicates an intermediate level Vref. When the pass position of the laser beam B is in the center position of the photoelectric conversion element SK, the output voltage of the integrator 232 indicates a maximum level on a high side from the intermediate level Vref. When the pass position of the laser beam B is in the center position of the photoelectric conversion element SJ, the output voltage of the integrator 232 indicates a minimum level on a low side from the intermediate level Vref.

Subsequently, the voltage of the level corresponding to the difference between the light receiving outputs of the photoelectric conversion elements SJ, SI is outputted from the differential amplifier 231c, and the output voltage of the differential amplifier 231c is selected by the selection circuit 234 and integrated by the integrator 232. As shown in FIG. 11, the output voltage of the integrator 232 changes in accordance with the pass position of the laser beam B between the photoelectric conversion elements SJ, SI. When the pass position of the laser beam B is in the center position between the photoelectric conversion elements SJ, SI as in a laser beam B2 shown by the shown broken line, the output voltage of the integrator 232 indicates the intermediate level Vref. When the pass position of the laser beam B is in the center position of the photoelectric conversion element SJ, the output voltage of the integrator 232 indicates the maximum level on the high side from the intermediate level Vref. When the pass position of the laser beam B is in the center position of the photoelectric conversion element SI, the output voltage of the integrator 232 indicates the minimum level on the low side from the intermediate level Vref.

The laser beam B passed through the region of the photoelectric conversion elements SK, SJ, SI hits the photoelectric conversion element SL. The conversion start signal is generated by the conversion start signal generation circuit 235 in the light receiving timing of the photoelectric conversion element SL. By the conversion start signal, the output voltage of the integrator 232 is converted to the digital data by the A/D converter 233. The digital data is supplied to the print CPU 90 as the signal which indicates the scanning position of the laser beam B in the regions of the photoelectric conversion elements SK, SJ, SI.

The laser beam B passed through the photoelectric conversion element SL subsequently hits the photoelectric conversion element SS. The reset signal (pulse signal) having the time width corresponding to the period from when the photoelectric conversion element SA receives the light until the photoelectric conversion element SS receives the light is generated by the reset signal generation circuit 236, and the integrator 232 is reset by the reset signal.

The laser beam B which has passed through the photoelectric conversion element SS subsequently goes across the photoelectric conversion elements SP, SO. When the across position exists in the upper part of FIG. 10, the light receiving time of the photoelectric conversion element SP lengthens, and the light receiving time of the photoelectric conversion element SO relatively shortens. The difference between the output signals in accordance with the light receiving time of these photoelectric conversion elements SP, SO corresponds to the across position of the laser beam B.

Moreover, the voltage of the level corresponding to the difference between the light receiving outputs of the photoelectric conversion elements SP, SO is outputted from the differential amplifier 231a, and the output voltage of the differential amplifier 231a is integrated by the integrator 232. As shown in FIG. 8 described above, the output voltage of the integrator 232 linearly changes between the minimum voltage Vmin and maximum voltage Vmax in accordance with the across position of the laser beam B in the photoelectric conversion elements SP, SO. When the across position of the laser beam B exists in the upper position of FIG. 10, the output voltage of the integrator 232 indicates the high level. When the across position of the laser beam B is in the middle, the output voltage of the integrator 232 is Vref.

When the laser beam B passed through the photoelectric conversion elements SP, SO hits the photoelectric conversion element SQ, the conversion start signal is generated by the conversion start signal generation circuit 235 in the light receiving timing of the photoelectric conversion element SQ. By the conversion start signal, the output voltage of the integrator 232 is converted to the digital data by the A/D converter 233. The digital data is supplied to the print CPU 90 as the signal which indicates the scanning position of the laser beam B in the regions of the photoelectric conversion elements SP, SO.

The print CPU 90 includes the following means (11) to (17) which are main functions relating to the control of the print engine 93 in addition to the means (1) to (5) in the first embodiment:

(11) control means for generating the laser beam B (fixed beam B0) whose scanning position is fixed from the laser oscillator 204a, selecting the output voltage of the differential amplifier 231a corresponding to the light receiving outputs of the photoelectric conversion elements SP, SO at a fixed beam generation time by the selection circuit 234, and storing the output voltage of the integrator 232 (output data of the A/D converter 233) as fixed position data V1 in an internal memory;

(12) control means for generating the laser beam B (movable beam B1) from the laser oscillator 204b to appropriately repeat the scanning after storing the reference position data V1, selecting the output voltage of the differential amplifier 231b corresponding to the photoelectric conversion elements SJ, SK by the selection circuit 234, monitoring output data of the A/D converter 233, setting the input values X, Y of the digital data with respect to the D/A converter for the fine adjustment 214 and the D/A converter for the coarse adjustment 215 in accordance with a monitored result to drive the galvano-mirror 206, and bringing the scanning position of the movable beam B1 into the center position between the photoelectric conversion elements SJ, SK;

(13) control means for selecting the output voltage of the differential amplifier 231a corresponding to the light receiving outputs of the photoelectric conversion elements SP, SO by the movable beam B1 by the selection circuit 234, and storing the output voltage of the integrator 232 (output data of the A/D converter 233) as first movable position data Vjk in the internal memory, when the movable beam B1 has been moved to the center position between the photoelectric conversion elements SJ, SK;

(14) control means for generating the laser beam B (movable beam B2) from the laser oscillator 204b to appropriately repeat the scanning after storing the movable position data Vjk, selecting the output voltage of the differential amplifier 231c corresponding to the photoelectric conversion elements SJ, SI by the selection circuit 234, monitoring the output data of the A/D converter 233, setting the input values X, Y of the digital data with respect to the D/A converter for the fine adjustment 214 and the D/A converter for the coarse adjustment 215 in accordance with the monitored result to drive the galvano-mirror 206, and bringing the scanning position of the movable beam B2 into the center position between the photoelectric conversion elements SJ, SI;

(15) control means for selecting the output voltage of the differential amplifier 231a corresponding to the light receiving outputs of the photoelectric conversion elements SP, SO by the movable beam B2 by the selection circuit 234, and storing the output voltage of the integrator 232 (output data of the A/D converter 233) as second movable position data Vji in the internal memory, when the movable beam B2 has been moved to the center position between the photoelectric conversion elements SJ, SI;

(16) calculation means for dividing a difference between the movable position data Vjk and Vji (=Vjk−Vji) by a defined distance h2 between the center position between the photoelectric conversion elements SJ, SK and the center position between the photoelectric conversion elements SJ, SI to calculate an integral output voltage Vunit per unit distance (V/$\mu$m), Vunit=(Vjk−Vji)/h2; and

(17) control means for generating the laser beam B (movable beam B3) from the laser oscillator 204b after calculating the integral output voltage Vunit per unit distance, selecting the output voltage of the differential amplifier 231a corresponding to the light receiving outputs of the photoelectric conversion elements SP, SO at the movable beam generation time by the selection circuit 234, capturing the output voltage of the integrator 232 (output data of the A/D converter 233) at this time as movable position data V2, setting the input values X, Y of the digital data with respect to the D/A converter for the fine adjustment 214 and D/A converter for the coarse adjustment 215 to drive the galvano-mirror 206 so that a difference (=V1−V2) between the fixed position data V1 stored beforehand and the movable position data V2 agrees with a product (=R·Vunit) of a distance R ($\mu$m) between reference beams determined in accordance with a target resolution and the calculated integral output voltage Vunit per unit distance, and setting the scanning position of the movable beam B3 to an appropriate position which matches the target resolution. When the target resolution is, for example, 600 dpi, a distance R between the reference beams is 42.3 ($\mu$m).

The other constitution is the same as that of the first embodiment.

The function will be described.

First, the laser beam B whose scanning position is fixed (fixed beam B0) is emitted from the laser oscillator 204a, and the output voltage of the differential amplifier 231a corresponding to the light receiving outputs of the photoelectric conversion elements SP, SO at the fixed beam generation time is selected by the selection circuit 234. The output voltage of the integrator 232 at this time (output data of the A/D converter 233) is stored as the fixed position data V1 in the internal memory.

After the reference position data V1 is stored, the laser beam B (movable beam B1) is emitted from the laser oscillator 204b, the scanning is appropriately repeated, the output voltage of the differential amplifier 231b corresponding to the photoelectric conversion elements SJ, SK is selected by the selection circuit 234, and the output data of the A/D converter 233 is monitored. The input values X, Y of the digital data with respect to the D/A converter for the fine adjustment 214 and the D/A converter for the coarse adjustment 215 are set in accordance with the monitored result, thereby the galvano-mirror 206 is driven, and the scanning position of the movable beam B1 is brought into the center position between the photoelectric conversion elements SJ, SK.

When the movable beam B1 has been moved to the center position between the photoelectric conversion elements SJ, SK, the output voltage of the differential amplifier 231a corresponding to the light receiving outputs of the photo-electric conversion elements SP, SO by the movable beam B1 is selected by the selection circuit 234. The output voltage of the integrator 232 (output data of the A/D converter 233) is stored as the first movable position data Vjk in the internal memory.

After the movable position data Vjk is stored, the laser beam B (movable beam B2) is emitted from the laser oscillator 204b, the scanning is appropriately repeated, the output voltage of the differential amplifier 231c corresponding to the photoelectric conversion elements SJ, SI is selected by the selection circuit 234, and the output data of the A/D converter 233 is monitored. The input values X, Y of the digital data with respect to the D/A converter for the fine adjustment 214 and the D/A converter for the coarse adjustment 215 are set in accordance with the monitored result, thereby the galvano-mirror 206 is driven, and the scanning position of the movable beam B2 is brought into the center position between the photoelectric conversion elements SJ, SI.

When the movable beam B2 has been moved to the center position between the photoelectric conversion elements SJ, ST, the output voltage of the differential amplifier 231a corresponding to the light receiving outputs of the photoelectric conversion elements SP, SO by the movable beam B2 is selected by the selection circuit 234. The output voltage of the integrator 232 (output data of the A/D converter 233) at this time is stored as the second movable position data Vji in the internal memory.

The difference between the movable position data Vjk and Vji (=Vjk−Vji) is obtained, and divided by the defined distance h2 between the center position between the photoelectric conversion elements SJ, SK and the center position between the photoelectric conversion elements SJ, SI to calculate the integral output voltage Vunit per unit distance (V/µm):

Vunit=(Vjk−Vji)/h2.

After the integral output voltage Vunit per unit distance is calculated, the laser beam B (movable beam B3) is emitted from the laser oscillator 204b, and the output voltage of the differential amplifier 231a corresponding to the light receiving outputs of the photoelectric conversion elements SP, SO at the movable beam generation time is selected by the selection circuit 234. The output voltage of the integrator 232 (output data of the A/D converter 233) at this time is captured as movable position data V2. The input values X, Y of the digital data with respect to the D/A converter for the fine adjustment 214 and D/A converter for the coarse adjustment 215 are set so that the difference (=V1−V2) between the fixed position data V1 stored beforehand and the movable position data V2 agrees with the product (=R·Vunit) of the distance R (µm) between the reference beams determined in accordance with the target resolution and the calculated integral output voltage Vunit per unit distance. Accordingly, the galvano-mirror 206 is driven, and the scanning position of the movable beam B3 is set to the appropriate position which matches the target resolution.

When the photodetector 208 and signal processing circuit 230 are employed, the scanning position of the movable beam is precisely detected. The scanning position of the movable beam can be set to the appropriate position which matches the target resolution.

The other function and effect are the same as those of the first embodiment.

[5] A fifth embodiment will be described.

In the above-described first, second, and fourth embodiments, since at least one of the plurality of laser beams B is physically fixed, the scanning position of each laser beam B is controlled using the fixed beam as the reference. Additionally, the scanning position of the fixed beam sometimes changes by vibrations with an elapse of time.

Figure 12:
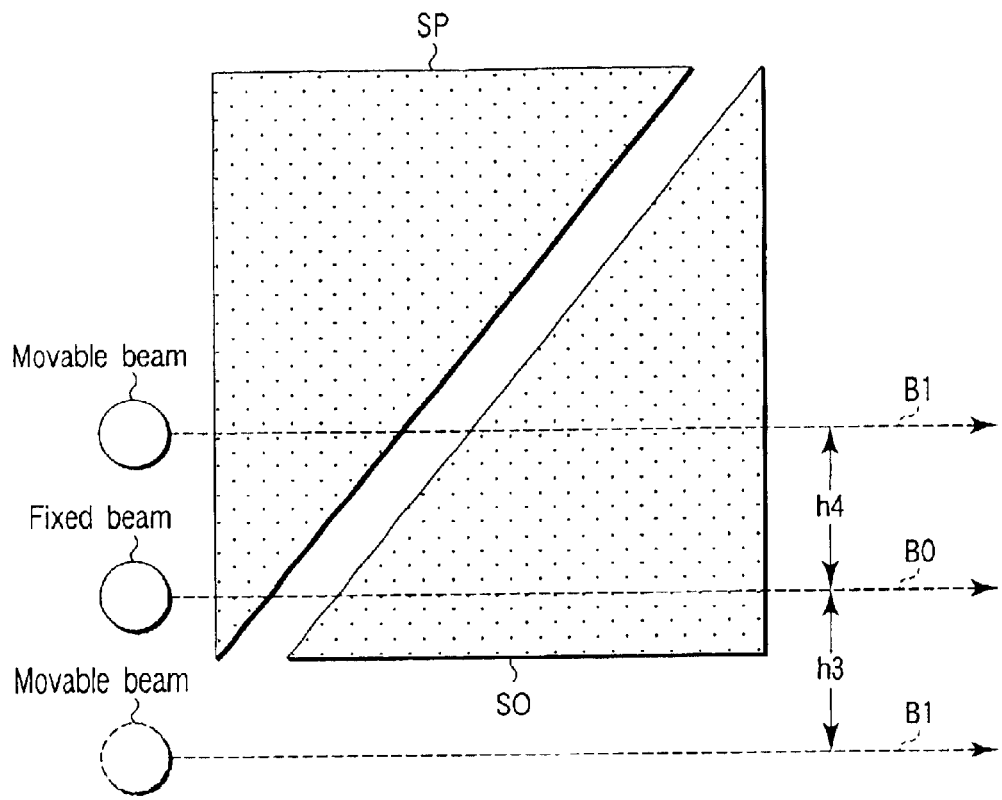
FIG. 12 is a diagram showing scanning positions of fixed and movable beams with respect to the photo-detection unit in the fifth embodiment.

When the scanning position of the fixed beam changes, it is difficult to set the scanning position of the movable beam to the appropriate position. In a worst case, as shown in FIG. 12, the scanning position of the fixed beam B0 deviates downwards. Accordingly, the movable beam B2 sometimes deviates from the light receiving region of the photodetector 208.

To solve the problem, the print CPU 90 includes the following means (21) to (23) which are main functions relating to the control of the print engine 93 in addition to the means of the respective embodiments:

(21) fourth control means for executing control of the input values X, Y of the digital data with respect to the D/A converter for the fine adjustment 214 and D/A converter for the coarse adjustment 215 by the second and third control means so as to allow the galvano-mirror 206 to rotate in a state in which the scanning position of the movable beam B1 is within a position at a predetermined interval on the other side with respect to the scanning position of the fixed beam B0 detected by the photodetector 208, when the input value Y of the digital data with respect to the D/A converter for the coarse adjustment 215 is shifted, and when the movable beam B1 is not detected by the photodetector 208 although the input value Y reaches the limit value;

(22) fifth control means for setting allocation of the image data into two systems by the image data interface 201 (allocation with respect to the laser oscillators 204a, 204b) to allocation reverse to conventional allocation, and switching operation patterns of the laser oscillators 204a, 204b in response to the read image, when the input value Y of the digital data with respect to the D/A converter for the coarse adjustment 215 is shifted, and when the movable beam B1 is not detected by the photodetector 208 although the input value Y reaches the limit value; and

(23) notification means for notifying a trouble by display in the liquid crystal display portion 14 of the window 12, when the input value Y of the digital data with respect to the D/A converter for the coarse adjustment 215 is shifted, and when the movable beam B1 is not detected by the photodetector 208 although the input value Y reaches the limit value.

The other constitution is the same as that of the first, second, and fourth embodiments.

The function will be described.

For the scanning position of each laser beam B detected by the photodetector 208, in a direction in which the movable beam B1 emitted from the laser oscillator 204b and reflected by the galvano-mirror 206 is in the predetermined position (position in which a given interval h3 is maintained with respect to the scanning position of the fixed beam B0 emitted from the laser oscillator 204a whose reference position is fixed), the galvano-mirror 206 rotates. To achieve this, while the input value Y of the digital data with respect to the D/A converter for the coarse adjustment 215 is set to the predetermined value (any of Y1, Y2, . . . ), the input value X of the digital data with respect to the D/A converter for the fine adjustment 214 is increased/decreased/controlled (feedback-controlled).

When the input value X of the digital data with respect to the D/A converter for the fine adjustment 214 is decreased to reach the input lower limit value "00H" of the D/A converter for the fine adjustment 214, the input value X is shifted to the input upper limit value "FFH" of the D/A converter for the fine adjustment 214, and the input value Y of the digital data with respect to the D/A converter for the coarse adjustment 215 is shifted by one step in an increase direction.

When the input value X of the digital data with respect to the D/A converter for the fine adjustment 214 is increased to reach the input upper limit value "FFH" of the D/A converter for the fine adjustment 214, the input value X is shifted to the input lower limit value "00H" of the D/A converter for the fine adjustment 214. Additionally, the input value Y of the digital data with respect to the D/A converter for the coarse adjustment 215 is shifted by one step in the increase direction.

Additionally, the position of the laser oscillator 204a whose reference position is to be fixed sometimes changes with the vibrations. For example, when the scanning position of the fixed beam B0 emitted from the laser oscillator 204a deviates downwards as shown in FIG. 12, the galvano-mirror 206 is driven so as to converge the scanning position of the movable beam B1 emitted from the laser oscillator 204b to the position at a given interval h3 from the fixed beam B0. Then, the scanning position of the movable beam B1 deviates downwards from the light receiving region of the photodetector 208.

Figure 13:
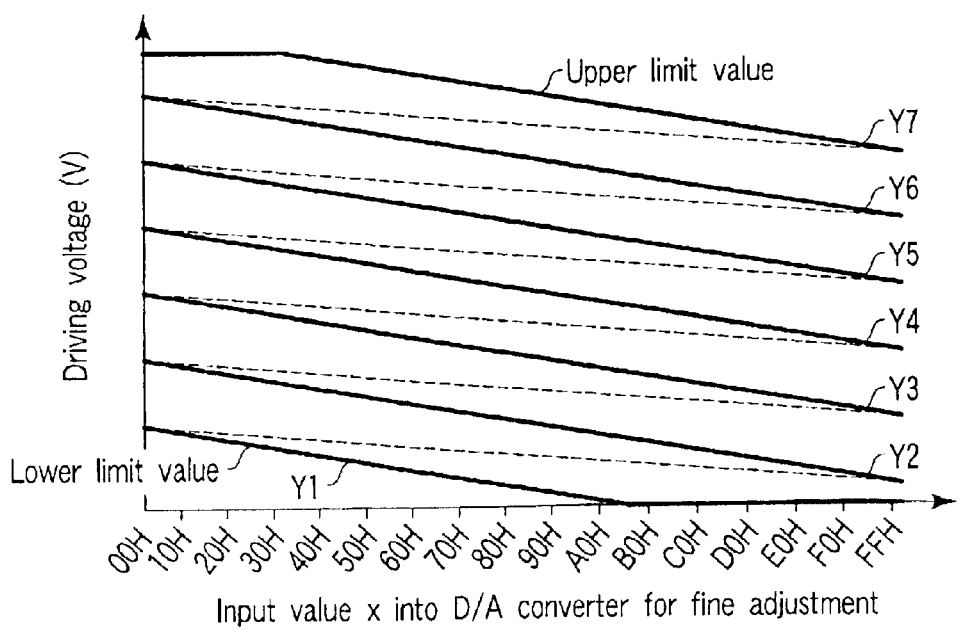
FIG. 13 is a diagram showing the relation between the input values X, Y with respect to the D/A converters and the driving voltage with respect to the galvano-mirror in the fifth embodiment.

In this case, the input value Y of the digital data with respect to the D/A converter for the coarse adjustment 215 is shifted. Although the input value Y of the digital data reaches a lower limit value Y1 shown in FIG. 13, the photodetector 208 cannot detect the movable beam B1. This state continues.

In the continued state in which the movable beam B1 cannot be detected, the control of the input values X, Y of the digital data is executed with respect to the D/A converter for the fine adjustment 214 and D/A converter for the coarse adjustment 215. Accordingly, the galvano-mirror 206 rotates in a state in which the scanning position of the movable beam B1 is within the position at a predetermined interval h4 (=h3) on the other side (upper side) with respect to the scanning position of the fixed beam B0 detected by the photodetector 208.

Additionally, the allocation of the image data into two systems by the image data interface 201 (allocation with respect to the laser oscillators 204a, 204b) is set to the allocation reverse to the conventional allocation, and the operation patterns of the laser oscillators 204a, 204b are switched in response to the read image. Accordingly, even when the movable beam B1 moves to the upper side of the fixed beam B0, the adequate image formation can be continued.

Moreover, the occurrence of the trouble in the scanning position is simultaneously notified to the user or the serviceman by character display or image display in the liquid crystal display portion 14 of the window 12. By this notification, treatments such as correction of the scanning position and replacement of a laser optical system are performed in early stages.

The other function and effect are the same as those of any of the first, second, and fourth embodiments.

[6] Modification Example

It is to be noted that in the first, second, fourth, and fifth embodiments, the example of the use of two laser beams B as multi-beams has been described. However, the number of laser beams B is not limited, and the present invention can similarly be carried out even with three or more laser beams.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image forming apparatus comprising:
    an image bearing member;
    at least one beam generation unit which emits a beam to scan the image bearing member;
    a galvano-mirror which reflects the beam emitted from the beam generation unit for the scanning and which rotates by an amount corresponding to a level of an inputted driving voltage to change a reflection angle, thereby adjusting a scanning position of the beam;
    a first digital/analog conversion unit into which digital data to continuously and finely adjust the reflection angle of the galvano-mirror is inputted and which outputs a voltage signal of a level corresponding to the digital data;
    a second digital/analog conversion unit into which digital data to stepwise and coarsely adjust the reflection angle of the galvano-mirror is inputted and which outputs the voltage signal of the level corresponding to the digital data;
    an amplification circuit which outputs the voltage of the level corresponding to the output voltage of the first digital/analog conversion unit and the output voltage of the second digital/analog conversion unit as a driving voltage to the galvano-mirror;
    a detection section which detects the scanning position of the beam in the image bearing member;
    a first control section which increases/decreases/controls an input value of the digital data with respect to the first digital/analog conversion unit in a state in which the input value of the digital data with respect to the second digital/analog conversion unit is set to a predetermined value so as to allow the galvano-mirror to rotate in a direction in which the scanning position detected by the detection section is within a predetermined position; and
    a second control section which shifts the input value of the digital data with respect to the first digital/analog conversion unit to the other limit value of the first digital/analog conversion unit and which shifts the input value of the digital data with respect to the second digital/analog conversion unit by one step, when the input value of the digital data with respect to the first digital/analog conversion unit changes by the first control section to reach one limit value of the first digital/analog conversion unit.

2. The apparatus according to claim 1, wherein the image bearing member is a movable photosensitive member,
    the detection section detects the scanning position of the beam in a movement direction of the photosensitive member, and
    the beam generation unit simultaneously emits a plurality of beams to scan the photosensitive member in a direction crossing at right angles to the movement direction of the photosensitive member.

3. The apparatus according to claim 1, wherein an output voltage of the second digital/analog conversion unit in shifting the input value of the digital data by one step is smaller than a maximum change width of the output voltage of the first digital/analog conversion unit.

4. The apparatus according to claim 1, wherein the detection section includes a photodetector which emits an electric signal at a light receiving time of the beam, and a signal processing circuit which processes an output signal of the photodetector to output a signal indicating the scanning position of the beam.

* * * * *